April 16, 1929.  A. J. DENNISS ET AL  1,709,782

FILM PRESSURE PLATE OR PAD FOR PHOTOGRAPHIC CAMERAS

Filed April 14, 1927  3 Sheets-Sheet 1

Inventors
A. J. Denniss
and V. W. Edwards
by Wilkinson & Giusta
Attorneys.

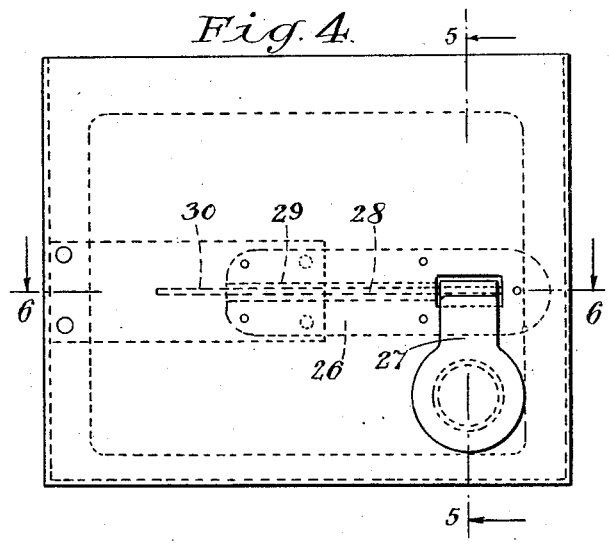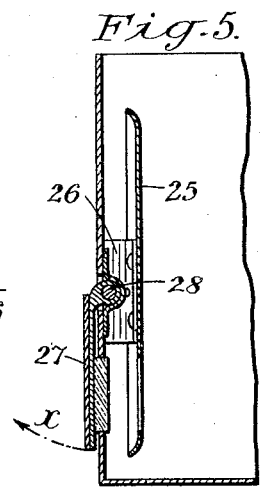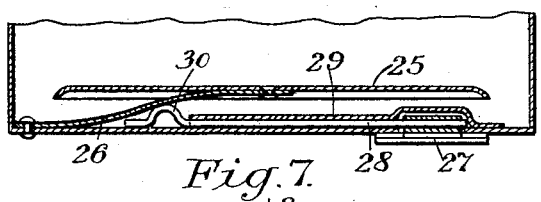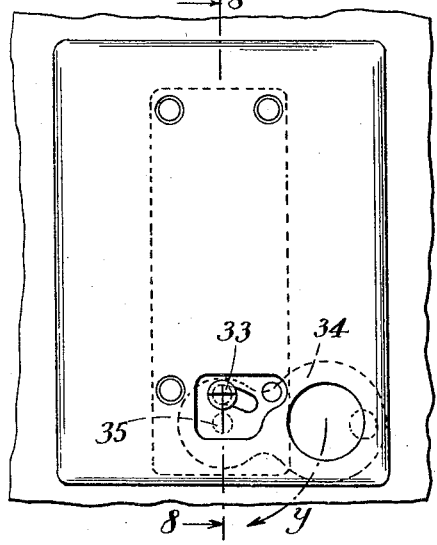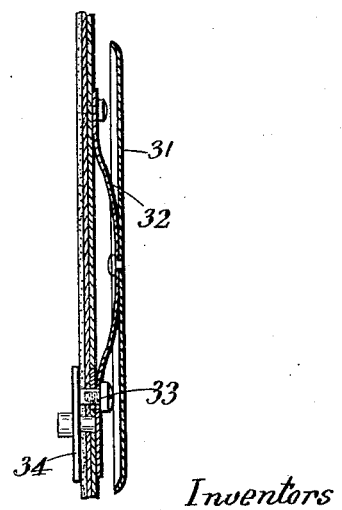

April 16, 1929.   A. J. DENNISS ET AL   1,709,782
FILM PRESSURE PLATE OR PAD FOR PHOTOGRAPHIC CAMERAS
Filed April 14, 1927   3 Sheets-Sheet 3
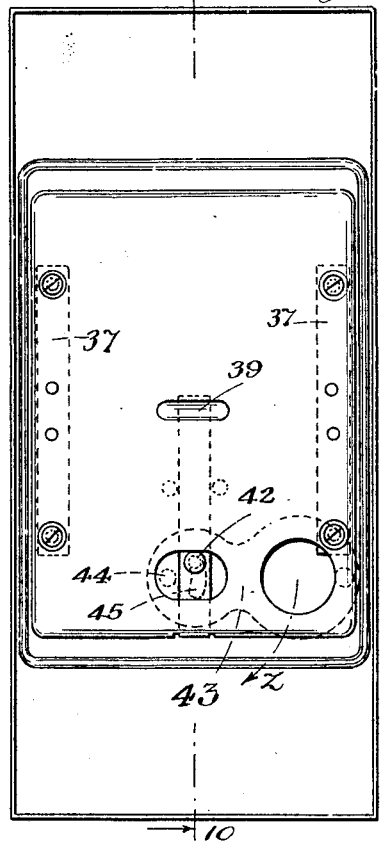
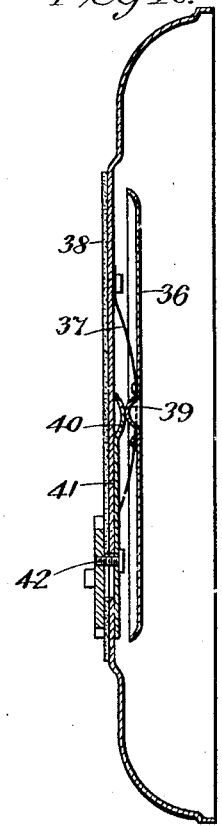
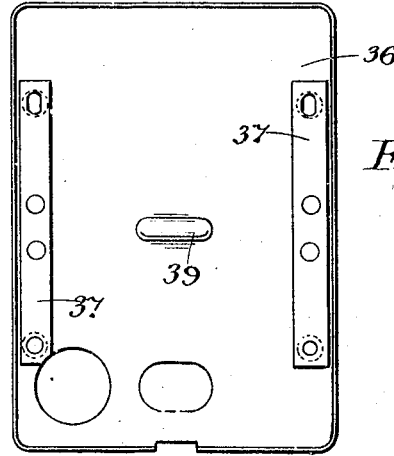
Inventors
A. J. Denniss
and V. W. Edwards
by Wilkinson & Giusta
Attorneys.

Patented Apr. 16, 1929.

1,709,782

UNITED STATES PATENT OFFICE.

ALFRED JOSEPH DENNISS, OF CHINGFORD, AND VALENTINE WILLIAM EDWARDS, OF WALTHAMSTOW, LONDON, ENGLAND, ASSIGNORS TO THE HOUGHTON-BUTCHER MANUFACTURING COMPANY LIMITED, OF LONDON, ENGLAND, AN ENGLISH LIMITED LIABILITY COMPANY.

FILM-PRESSURE PLATE OR PAD FOR PHOTOGRAPHIC CAMERAS.

Application filed April 14, 1927, Serial No. 183,804, and in Great Britain October 29, 1926.

This invention relates to roll film photographic cameras in which a pressure device such as a spring loaded plate or pad employed to hold the sensitive film flat in the focal plane is provided with means operable from outside the camera back to press the spring loaded plate or pad down upon the film, and also to release the pressure when the film is to be moved from one exposure to the next. In such an arrangement, if the pressure is maintained on the film by omitting to operate the freeing device scratches or striations may be made on the film as it is wound along. An object of the present invention is to provide a construction in which this possibility of error on the part of the operator is reduced or eliminated.

According to the present invention, the externally operable freeing device for the pressure plate or pad is constructed and arranged in such a manner that it covers the ruby window (or aperture through which the exposure number is ordinarily visible) at such time as the pressure plate or pad is pressed upon the film. Thus before the operator can watch for the appearance of the new exposure number, he must release the pressure on the film by moving the operating device away from the ruby window thereby releasing the pressure on the film.

A general form of construction in accordance with the present invention consists in mounting the pressure plate or pad on a flat or leaf spring normally acting to withdraw the pressure plate or pad from contact with the film, various devices being employed to act upon the spring or the pressure plate or pad to thrust the latter down upon the film when an exposure is to be made. The type of operating means employed will vary according to the construction of the camera.

Examples of suitable forms of construction in accordance with the invention are illustrated in the accompanying drawings, in which:—

Fig. 4 is a rear elevation,

Fig. 5 a local section on the line 5—5 Fig. 4, and

Fig. 6 a local section on the line 6—6 Fig. 4 of an alternative form of construction applied to a box camera.

Figs. 7 and 8 are respectively a local rear elevation and a section on the line 8—8 Fig. 7 of another form of construction.

Fig. 9 is a rear elevation,

Fig. 10 a section on the line 10—10, Fig. 9 and

Fig. 11 a local view showing a method of mounting the pressure plate in still another constructional form.

Figure 1:
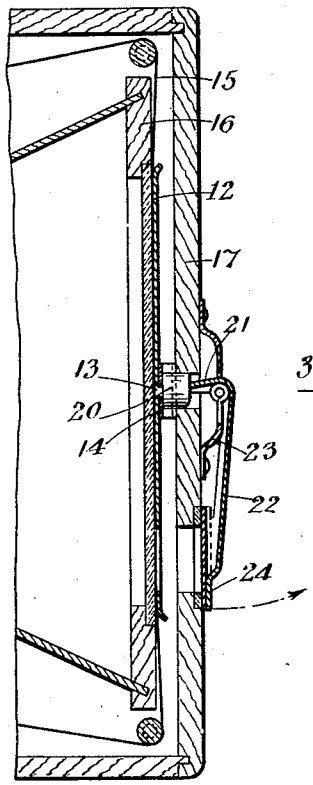
Fig. 1 is a sectional plan on the line 1—1 Fig. 2 of a box camera embodying one form of construction according to this invention, the pressure plate being shewn in operative position against the film.
Figure 2:
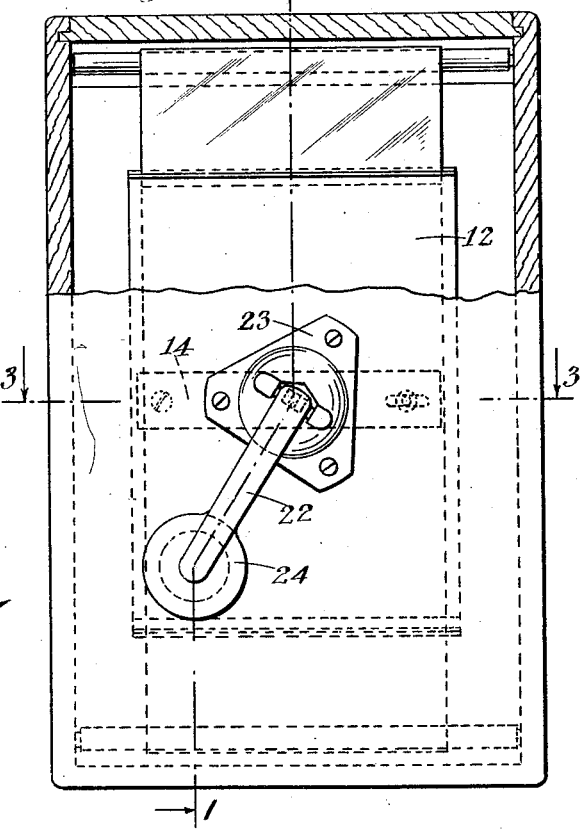
Fig. 2 is a rear elevation partly in section.
Figure 3:
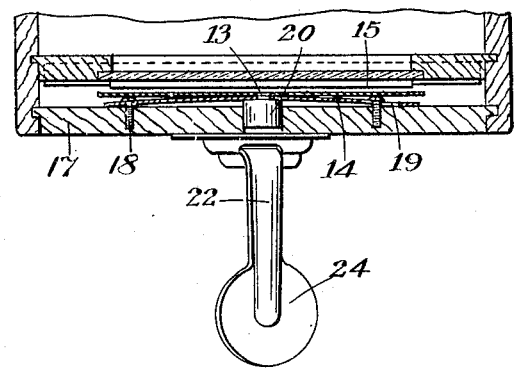
Fig. 3 is a local cross section on the line 3—3 Fig. 2 of the same construction, Fig. 3 shewing the pressure plate released.

Referring to Figs. 1 to 3:—

A pressure plate 12 of thin sheet metal or the like is mounted by means of a countersunk rivet 13 towards the middle of a leaf spring 14, the plate 12 being preferably somewhat loose on the rivet to enable the pressure of the plate to be distributed evenly on the film 15 which passes across the usual frame 16 in the focal plane and against which it is held when the pressure plate is thrust inwards. The spring 14 is rigidly secured at one end to the camera back 17 by a screw 18 (see Fig. 3) the other end being provided with a slot 19 to allow longitudinal movement.

Rigidly secured to the spring is a stud 20 entering a hole in the camera back and acted upon by an inturned nose 21 of a lever 22 pivoted to a plate 23 screwed to the outside of the camera back. The free end of the lever 22 is provided with a plate 24 adapted to cover the usual ruby window when the lever is flat upon the camera back and the pressure plate 12 is in contact with the film as in Figs. 1 and 2.

To release the pressure, the lever is lifted as shown in Fig. 3 and the spring 14 retracts the pressure plate 12 to allow the film to be moved freely.

In Figs. 4 to 6 the pressure plate 25 is riveted preferably loosely as above described to one end of a leaf spring 26 the other end of which is riveted to the camera back. An arm 27 adapted to cover the ruby window in its flat position has secured thereto a rod 28 lying across the inner surface of the camera back and turning in a guide 29, the inner end of the rod being bent to form a nose or projection 30 engaging the spring 26. To withdraw the pressure plate 25 the arm 27 is lifted in the direction of the arrow $x$ Fig. 5, the projection 30 turning to lie flat against the camera back and allowing the spring 26 to retract the pressure plate.

In the form shown in Figs. 7 and 8 the pressure plate 31 is loosely riveted as aforesaid to a spring 32 secured at one end to the camera back and provided towards its other end with a slot in which works a stud 33 carried excentrically on an arm 34 pivoted at 35 and arranged to cover the ruby window in the position shown, the spring 32 being bowed to thrust the pressure plate 31 into contact with the film. When the arm 34 is moved in the direction of the arrow $y$, Fig. 7, the stud 33 is moved back and allows the spring 32 to flatten and retract the pressure plate.

In Figs. 9 to 11 the pressure plate 36 is riveted to a pair of leaf springs 37 which tend normally to retract the pressure plate. The latter is provided with a central embossed ridge 39 co-operating with a nose or projection 40 on a slide 41 which is moved along the inner surface of the camera back by a stud 42 mounted eccentrically on an arm 43 pivoted at 44 and covering the ruby window in the position shown, the stud 42 passing through a slot 45 in a plate secured to the camera back. When the arm 43 is swung in the direction of the arrow $z$, Fig. 9, the projection 40 is moved away from the indentation 39 and the springs 37 retract the pressure plate.

What we claim is:—

1. In a roll film photographic camera, a pressure plate disposed behind the portion of the sensitive film which is in position for exposure, a movable mounting for said pressure plate, an actuating device mounted on the outside of the camera body and operatively connected to said pressure plate so as to force same into contact with the film to press the latter flat in the focal plane, said actuating device being positioned so as to cover the aperture in the camera body, through which the exposure member is ordinarily visible, at such time as the pressure plate is pressed against the film.

2. In a roll film photographic camera, a pressure plate disposed behind the portion of the sensitive film which is in position for exposure, a spring mounted on a fixed part of the camera body and carrying said pressure plate, an actuating device in operative relation to said spring such that the manipulation of said device in one direction forces the pressure plate into contact with the film and in the other direction allows the pressure plate to be retracted by the spring to release the film, a part of said actuating device on the outside of the body being positioned so as to cover the aperture, through which the exposure number is ordinarily visible, at such time as the pressure plate is pressed against the film and to uncover said aperture when the film is released.

3. In a roll film photographic camera a pressure plate disposed behind the portion of the sensitive film which is in position for exposure, a spring mounted on the inside of the camera back and carrying said pressure plate, an actuating lever pivoted to the outside of the camera back and in operative relation to said spring such that the manipulation of said lever in one direction forces the pressure plate into contact with the film and in the other direction allows the pressure plate to be retracted by the spring to release the film, a part of said actuating device being positioned so as to cover the aperture through which the exposure number is ordinarily visible, at such time as the pressure plate is pressed against the film and to uncover said aperture when the film is released.

4. In a roll film photographic camera, a pressure plate disposed behind the portion of film in position for exposure, a leaf spring mounted on the inside of the camera back and carrying said pressure plate, an actuating lever pivotally mounted on the outside of the camera back and having an internal part engaging the leaf spring in such a manner that the manipulation of said lever in one direction forces the pressure plate into contact with the film and in the other direction allows the pressure plate to be retracted by the spring to release the film, a part of said actuating device being positioned so as to cover the aperture through which the exposure number is ordinarily visible at such time as the pressure plate is pressed against the film and to uncover said aperture when the film is released.

5. In a roll film photographic camera, a pressure plate disposed behind the portion of the film in position for exposure, a leaf spring secured at one end to the inside of the camera back and loosely carrying said pressure plate towards the other end, an actuating lever pivoted to the outside of the camera back, a rod secured to said lever and passing across the inner surface of the camera back, a cam projection on said rod engaging the leaf spring in such a manner that the manipulation of said lever in one direction forces the pressure plate into contact with the film and in the other direction allows the pressure plate to be retracted by the spring to release the film, a part of said actuating lever being positioned so as to cover the aperture through which the exposure number is ordinarily visible at such time as the pressure plate is pressed against the film and to uncover said aperture when the film is released.

ALFRED JOSEPH DENNISS.
VALENTINE WILLIAM EDWARDS.